(No Model.)
O. P. LOOMIS.
GROUND DETECTOR FOR ELECTRIC CIRCUITS.
No. 405,572. Patented June 18, 1889.
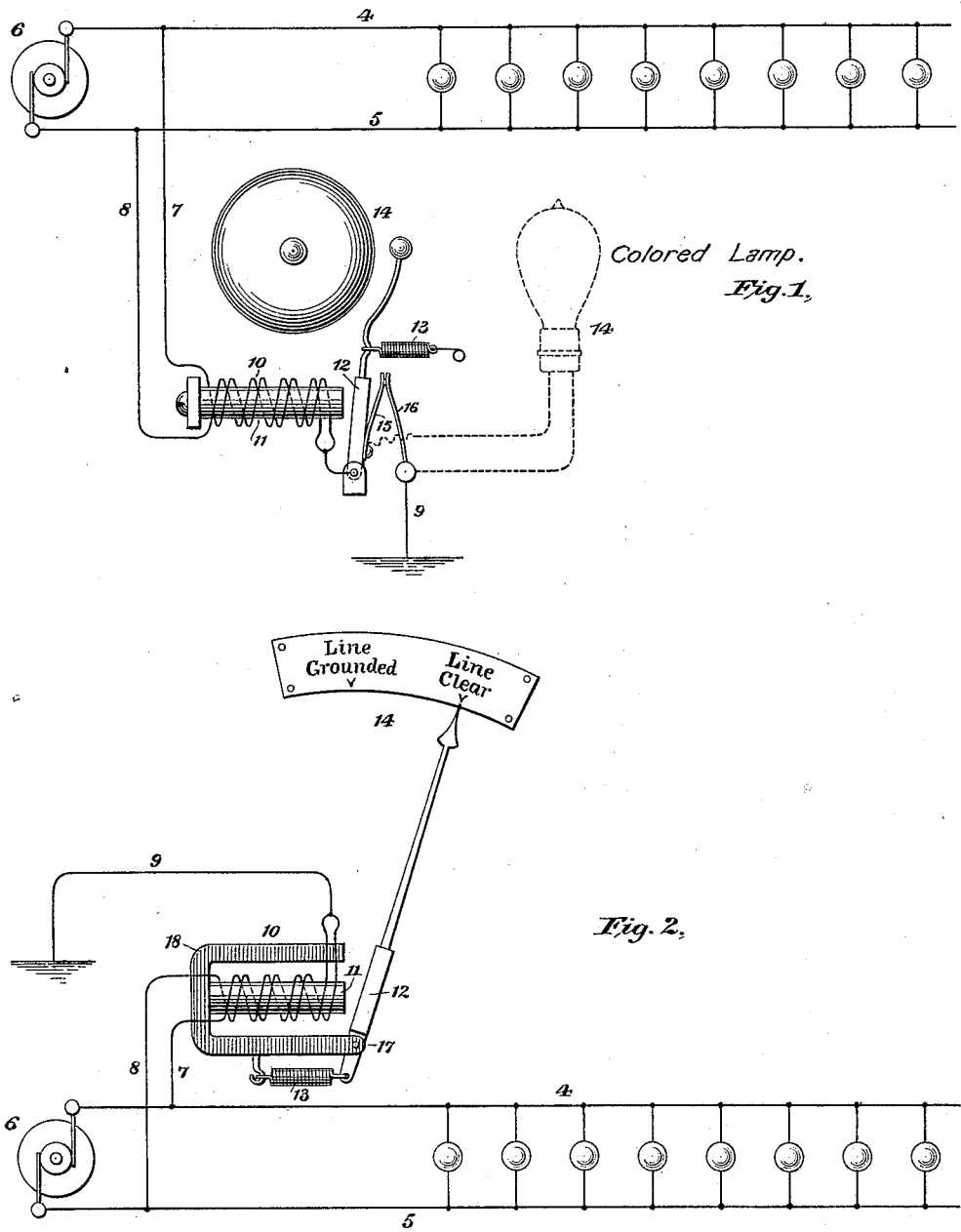

UNITED STATES PATENT OFFICE.

OSBORN P. LOOMIS, OF SOMERVILLE, MASSACHUSETTS, ASSIGNOR TO THE LOOMIS ELECTRIC MANUFACTURING COMPANY, OF NEW YORK, N. Y.

GROUND-DETECTOR FOR ELECTRIC CIRCUITS.

SPECIFICATION forming part of Letters Patent No. 405,572, dated June 18, 1889.

Application filed March 11, 1889. Serial No. 302,764. (No model.)

*To all whom it may concern:*

Be it known that I, OSBORN P. LOOMIS, a citizen of the United States, residing at Somerville, county of Middlesex, and State of Massachusetts, have invented certain new and useful Improvements in Ground-Detectors for Electric Circuits, of which the following is such a full, clear, and exact description as will enable any one skilled in the art to which it appertains to make and use the same, reference being had to the accompanying drawings, forming part of this specification.

My invention relates to apparatus for automatically detecting accidental grounds or faults in an electric circuit and giving a warning-signal of such defect. It has especial reference to electric-lighting systems wherein the defective ground is indicated, either audibly or visually, or both, at the central station, so that attention may at once be called to the occurrence.

The present invention seeks to simplify and render more efficient this class of apparatus; and, briefly stated, the invention consists in a normally-grounded detector line or wire connected across to the respective sides of the main line and including in its circuit a differentially-wound electro-magnet, the armature of which is arranged to control a suitable ground-signaling device, which is caused to give a signal, audible or visual, by the differential action in the magnet consequent upon accidental grounding of either side of the main line.

In the accompanying drawings, illustrating the application of the invention, Figures 1 and 2 are diagrammatic views of an automatic ground-detector apparatus constructed after the manner of my invention, and they show how different characters of ground-signaling devices may be used with the apparatus.

In the said drawings, like numbers of reference designate like and corresponding parts throughout.

Referring to the drawings, 4 5 designate a main line supplied with current by a suitable dynamo-electric machine 6. The detector-line 7 8 is connected to the respective sides of the main line 4 5, and forms a closed circuit or connection between the same. This detector-line is provided with a permanent or normal earth-connection 9, and includes in its circuit a differential electro-magnet 10. As shown, the detector-line 7 8 is wound about the core 11 of magnet 10 and returned on itself, so as to form a differential winding. The pivoted armature 12 of the magnet 10 is retracted by the spring 13. Under normal condition of the system, when the circuit is clear of accidental grounds or faults, the current will pass from the positive to the negative main and around the magnet 10 by way of the detector-line 7 8. The winding of this detector-line about the magnet is such that normally the current flows around the same in opposite directions and produces a neutral effect in the magnet, leaving its armature unaffected. Upon the occurrence of a ground on either side of the main line 4 5 the corresponding side of the detector-line 7 8 will be short-circuited, thereby disturbing the neutral condition of the magnet 10, which, becoming energized, will attract its armature 12, and cause to be operated any ground-indicating signal—such as 14—that may be placed under its control.

The indicating-signal may be either audible or visual, or it may be a combination of the two. There are many well-known forms of signaling devices that can be used in this invention for indicating the defective grounds. I have herewith shown three several forms of the same.

In Fig. 1 the form shown in full lines consists in an ordinary bell-signal 14, which will be operated in an evident manner through the movement of armature 12 upon an accidental ground occurring on the main 4 5. A ground on either side of the main will allow the current to pass to earth 9 by way of armature 12 and contact-fingers 15 16, which are normally closed on each other. The bell will then be rung by the magnet drawing down its armature, thereby breaking circuit over contacts 15 16, opening the ground-connection and causing the armature to fall away, and to again make circuit over the contacts, and thus repeat the bell-signal.

In Fig. 1 I have also shown, in dotted lines, the visual signal 14 in the form of a colored electric lamp, which is in the ground-connection 9 of the detector-line, the ground-circuit being in this construction through the lamp to the armature 12; thence to line 7 8, and also over the contacts 15 16 to line. Upon the closing of armature 12 on its magnet the colored signaling-lamp will receive the current in an obvious manner, and thus be caused to glow and indicate the ground. These two signals—the one audible and the other visual—may be used separately or together, as preferred. Instead of the signaling-lamp being made to burn permanently while the defective ground exists, it may be made to flash through vibrating armature 12, and thus make it conspicuous and more likely to be observed than otherwise.

In the construction shown in Fig. 2 the armature 12 controls a pointer, which moves over a dial marked "line clear" and "line grounded" at the respective limits of movement of the pointer, the former being registered with by the pointer when the armature 12 is open and the latter when the armature is closed on its magnet. This armature is pivoted at 17 to the horseshoe-shaped frame 18 of the magnet, which in this instance is stronger than the magnet in Fig. 1. The retracting-spring 13 of the armature is connected intermediate the latter and a hook on the magnet-frame.

In the system shown the translating devices illustrated in circuit may be supposed to be in a house-circuit, which is always likely to be thrown in contact with steam, gas, or water pipes, and in the course of time become short-circuited thereby.

Having thus described my improvements in ground-detectors for electric circuits, what I claim as my invention, and desire to secure by Letters Patent, is—

1. An automatic ground-detector for electric circuits, consisting in the combination, with the main line, of a detector-line having a normal ground thereon and connecting the respective sides of the said main line, a differential electro-magnet included in the said detector-line, an armature for said magnet, and a ground indicating or signaling device controlled by said armature and operated thereby upon accidental grounding of the said main line, substantially as and for the purpose set forth.

2. An automatic ground-detector for electric circuits, consisting in the combination, with the main line, of a detector-line normally grounded and connecting the respective sides of the said main line, a core of magnetic metal about which said detector-line is wound and returned on itself to form a differential winding, an armature for said core, and a ground indicating or signaling device governed by said armature, which causes the device to be operated by a differential action in the magnet consequent upon a ground occurring on the main line, substantially as and for the purpose set forth.

3. In an automatic ground-detector, the combination, with the main line 4 5, of the detector-line 7 8, having a normal ground-connection 9 and connecting the sides of the main 4 5, the differential magnet 10, having armature 12 and included in the said detector-line 7 8, and the ground signaling device 14, controlled by said armature 12 and operated thereby upon a differential action of the said magnet consequent upon an accidental ground on the said main line, substantially as and for the purpose set forth.

In testimony whereof I have set my hand and affixed my seal, this 27th day of February, 1889, in the presence of two subscribing witnesses.

OSBORN P. LOOMIS. [L. S.]

Witnesses:
AND. J. PROVOST,
WILLIS FOWLER.